(12) United States Patent
Kipurs et al.

(10) Patent No.: US 11,851,179 B1
(45) Date of Patent: Dec. 26, 2023

(54) IMAGING CONTROLS FOR UNMANNED AERIAL VEHICLES

(71) Applicant: Alarm.com Incorporated, Tysons, VA (US)

(72) Inventors: Agris Kipurs, Jelgava (LV); Ilja Nevdahs, Carnikava (LV); Deins Egle, Riga (LV)

(73) Assignee: Alarm.com Incorporated, Tysons, VA (US)

( * ) Notice: Subject to any disclaimer, the term of this patent is extended or adjusted under 35 U.S.C. 154(b) by 711 days.

(21) Appl. No.: 16/845,054

(22) Filed: Apr. 9, 2020

Related U.S. Application Data

(60) Provisional application No. 62/831,583, filed on Apr. 9, 2019.

(51) Int. Cl.
*B64C 39/02* (2023.01)
*G05D 1/10* (2006.01)
*B64U 101/30* (2023.01)

(52) U.S. Cl.
CPC ........... *B64C 39/024* (2013.01); *G05D 1/106* (2019.05); *B64U 2101/30* (2023.01); *B64U 2201/10* (2023.01)

(58) Field of Classification Search
CPC .. B64C 39/024; G05D 1/106; B64U 2201/10; B64U 2101/30; B64U 10/13; B64D 47/08
See application file for complete search history.

(56) References Cited

U.S. PATENT DOCUMENTS

| | | | |
|---|---|---|---|
| 9,350,954 B2 | 5/2016 | Wagreich | |
| 9,533,760 B1 | 1/2017 | Wagreich | |
| 9,977,429 B2 * | 5/2018 | Lee | ............................ G06T 7/11 |
| 10,322,801 B1 * | 6/2019 | Yeturu | ................... B64C 39/024 |
| 11,259,195 B1 * | 2/2022 | Nevdahs | ................ H04N 7/181 |
| 11,443,518 B2 * | 9/2022 | Cui | .......................... G06V 10/56 |
| 11,479,357 B1 * | 10/2022 | Nevdahs | .............. G08G 5/0013 |
| 2016/0198088 A1 * | 7/2016 | Wang | .................... H04N 23/698 |
| | | | 348/36 |
| 2016/0349746 A1 * | 12/2016 | Grau | ....................... G05D 1/102 |
| 2017/0322554 A1 * | 11/2017 | Lee | ....................... G05D 1/0094 |
| 2019/0055018 A1 | 2/2019 | Bei et al. | |

(Continued)

FOREIGN PATENT DOCUMENTS

EP           3246776           11/2017

*Primary Examiner* — Benjamin P Lee
(74) *Attorney, Agent, or Firm* — Fish & Richardson P.C.

(57) ABSTRACT

Methods, systems, and apparatus, including computer programs encoded on a computer storage medium, are described for performing privacy-aware surveillance with a security camera drone. The drone obtains image data using an imaging device and processes the image data to detect an object external to the drone. In response to processing the image data, the drone determines multiple viewing angles indicated in the image data with respect to the object. Based on the image data and the multiple viewing angles, a first section of the area for surveillance and a second, different section of the area to be excluded from surveillance are identified. The drone determines an adjustment to at least one of the multiple viewing angles to cause the second section to be excluded from surveillance. Based on the adjustment, the drone controls the imaging device to exclude the second section from surveillance imagery obtained by the drone.

19 Claims, 7 Drawing Sheets

(56) References Cited

U.S. PATENT DOCUMENTS

| | | | |
|---|---|---|---|
| 2019/0079522 A1* | 3/2019 | Grau | G05D 1/0094 |
| 2019/0144114 A1* | 5/2019 | Chen | G05D 1/101 |
| | | | 701/2 |
| 2019/0325758 A1 | 10/2019 | Yoshii et al. | |
| 2022/0171973 A1* | 6/2022 | Cui | G06V 20/56 |
| 2022/0343773 A1* | 10/2022 | Ali | G08G 5/0047 |

\* cited by examiner

```
                    ┌──────────────────────────────────────────────────────┐
                    │ OBTAINING IMAGE DATA USING AN IMAGING DEVICE         │
                    │ INSTALLED AT THE DRONE                               │
                    │                                                  610 │
                    └──────────────────────────────────────────────────────┘
                                             │
                                             ▼
                    ┌──────────────────────────────────────────────────────┐
                    │ PROCESSING THE IMAGE DATA TO DETECT AN OBJECT THAT   │
                    │ IS EXTERNAL TO THE DRONE                             │
                    │                                                  620 │
                    └──────────────────────────────────────────────────────┘
                                             │
                                             ▼
                    ┌──────────────────────────────────────────────────────┐
                    │ IN RESPONSE TO PROCESSING THE IMAGE DATA,            │
                    │ DETERMINING A PLURALITY OF VIEWING ANGLES INDICATED  │
                    │ IN THE IMAGE DATA WITH RESPECT TO THE OBJECT         │
                    │                                                  630 │
                    └──────────────────────────────────────────────────────┘
                                             │
                                             ▼
                    ┌──────────────────────────────────────────────────────┐
                    │ BASED ON THE IMAGE DATA AND THE PLURALITY OF         │
                    │ VIEWING ANGLES, IDENTIFYING A FIRST SECTION OF THE   │
                    │ AREA FOR SURVEILLANCE AND A SECOND, DIFFERENT        │
                    │ SECTION OF THE AREA TO BE EXCLUDED FROM SURVEILLANCE │
                    │                                                  640 │
                    └──────────────────────────────────────────────────────┘
                                             │
                                             ▼
                    ┌──────────────────────────────────────────────────────┐
                    │ DETERMINING AN ADJUSTMENT TO AT LEAST ONE OF THE     │
                    │ PLURALITY OF VIEWING ANGLES TO CAUSE THE SECOND,     │
                    │ DIFFERENT SECTION OF THE AREA TO BE EXCLUDED FROM    │
                    │ SURVEILLANCE                                         │
                    │                                                  650 │
                    └──────────────────────────────────────────────────────┘
                                             │
                                             ▼
                    ┌──────────────────────────────────────────────────────┐
                    │ BASED ON THE ADJUSTMENT, CONTROLLING THE IMAGING     │
                    │ DEVICE INSTALLED AT THE DRONE TO EXCLUDE THE SECOND, │
                    │ DIFFERENT SECTION OF THE AREA FROM SURVEILLANCE      │
                    │ IMAGERY OBTAINED BY THE DRONE                        │
                    │                                                  660 │
                    └──────────────────────────────────────────────────────┘
```

Fig. 6

IMAGING CONTROLS FOR UNMANNED AERIAL VEHICLES

CROSS-REFERENCE TO RELATED APPLICATION

This application claims the benefit of U.S. Application No. 62/831,583, filed Apr. 9, 2019, which is incorporated by reference in its entirety.

TECHNICAL FIELD

This specification generally relates to unmanned aerial devices.

BACKGROUND

Unmanned aerial vehicles can be configured as monitoring devices or sensors and are often dispersed at various locations at a property, such as a home or commercial business. These sensors and aerial devices can have distinct functions at different locations of the property. Some unmanned aerial vehicles (UAVs) at a property are autonomous vehicles or drones that offer different types of monitoring and control functionality. The functionality afforded by these drones can be leveraged to secure items at a property, to obtain information about respective items at multiple different properties, and to visually monitor conditions of items located at the properties. The usefulness and functionality of the drones may be dependent on their size, imaging ability, and related controls. In some cases, autonomous vehicles such as drones and UAVs may require small or light-weight designs that are beneficial for accomplishing objectives related to legislative initiatives, human and property safety considerations, or minimizing visual and acoustic footprints.

SUMMARY

One aspect of the subject matter described in this specification can be embodied in a method for surveilling an area using a drone. The method includes obtaining image data using an imaging device installed at the drone; processing the image data to detect an object that is external to the drone; and in response to processing the image data, determining multiple viewing angles indicated in the image data with respect to the object. The method includes, based on the image data and the multiple viewing angles, identifying a first section of the area for surveillance and a second, different section of the area to be excluded from surveillance; determining an adjustment to at least one of the multiple viewing angles to cause the second, different section of the area to be excluded from surveillance; and based on the adjustment, controlling the imaging device installed at the drone to exclude the second, different section of the area from surveillance imagery obtained by the drone.

These and other implementations can each optionally include one or more of the following features. For example, in some implementations, determining the adjustment to at least one of the multiple viewing angles includes: selecting a first viewing angle among the multiple viewing angles; calculating a new viewing angle that decreases an amount of the second, different section that is viewable from the first viewing angle; and determining the adjustment based on the new viewing angle.

In some implementations, the method includes determining an operating altitude of the drone, wherein the operating altitude corresponds to an altitude range that allows the drone to exclude the second, different section of the area from being included in the surveillance imagery obtained by the drone; and based at least on the operating altitude, controlling the drone, a sensor installed at the drone, and the imaging device to exclude the second, different section of the area from surveillance imagery obtained by the drone. In some implementations, determining the adjustment to at least one of the multiple viewing angles includes: determining a physical attribute of the object; and determining the adjustment based on the physical attribute of the object.

The object is intermediate, or generally intermediate, the first section and the second, different section of the area. In some implementations, the object defines a boundary that separates a first property represented by the first section owned by a first entity and a second, different property represented by the second, different section owned by a second entity. In some implementations, the object is a virtual object inserted as an overlay to define a boundary between the first section and the second, different section.

Determining the adjustment to at least one of the multiple viewing angles can include determining the adjustment based on an adjustment algorithm that is implemented using the imaging device, a sensor installed at the drone, and on-board circuitry of the drone. In some implementations, the adjustment algorithm is an on-board viewing angle adjustment algorithm that is implemented using software instructions executed by a processor integrated in the on-board circuitry of the drone.

The adjustment algorithm is operable to adjust viewing angles of the imaging device during operation of the drone as the drone obtains surveillance imagery of the property. In some implementations, the method includes performing an initial mapping of the area based on a mapping algorithm; generating an initial map of the area in response to performing the initial mapping; and generating, using the mapping algorithm, one or more subsequent maps of the area based on the adjustment.

The drone can include multiple cameras, and each camera of the multiple cameras can represent a respective imaging device installed at the drone. In some implementations, processing the image data includes determining frame coverages for each of the multiple cameras installed at the drone. Determining the frame coverages can include dynamically calculating a respective frame coverage for each of multiple cameras installed at the drone, wherein each of the respective frame coverages are calculated concurrently as the image data is being obtained.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 shows an example process for monitoring a property using a drone.

Like reference numbers and designations in the various drawings indicate like elements.

DETAILED DESCRIPTION

This specification describes techniques for improved control of the imaging capabilities of unmanned, autonomous aerial vehicles ("drones") as well as property monitoring systems for commercial or residential properties that can use the drones to monitor items or conditions at the property. For example, a drone is described that includes at least an imaging device and one or more sensors. The drone can represent an example security drone or security camera drone system. In general, an example security camera drone system may be installed and configured to operate and perform surveillance in many different environments or areas, including areas with multiple different properties.

A drone may be tasked to monitor or perform surveillance on a property in area where the property is located close to, or substantially to, another property (described below as a "third-party property"). The drone includes a digital imaging device, such as a digital camera, and on-board circuitry that are used to capture images during surveillance of the property. Based on the described techniques, the imaging device and on-board circuitry of the drone can be configured to dynamically adjust an altitude of the drone and viewing angles employed by the imaging device to exclude, avoid, or otherwise reduce a likelihood of capturing images and video of the other property in surveillance imagery obtained by the drone.

The property monitoring system may include sensors, such as motion or imaging sensors, at a property to monitor conditions at the property. In addition to the sensors, drones can be positioned at the property to monitor conditions at the property. The monitoring system includes a control unit and controls that enable automation of actions at the property. Security/property monitoring systems can include several sensors, drones, and other devices that perform specific functions at a property. These drones and devices interact with the control units, or directly with a monitoring server, to provide sensor data to the monitoring server and to receive commands from the monitoring server.

Figure 1:
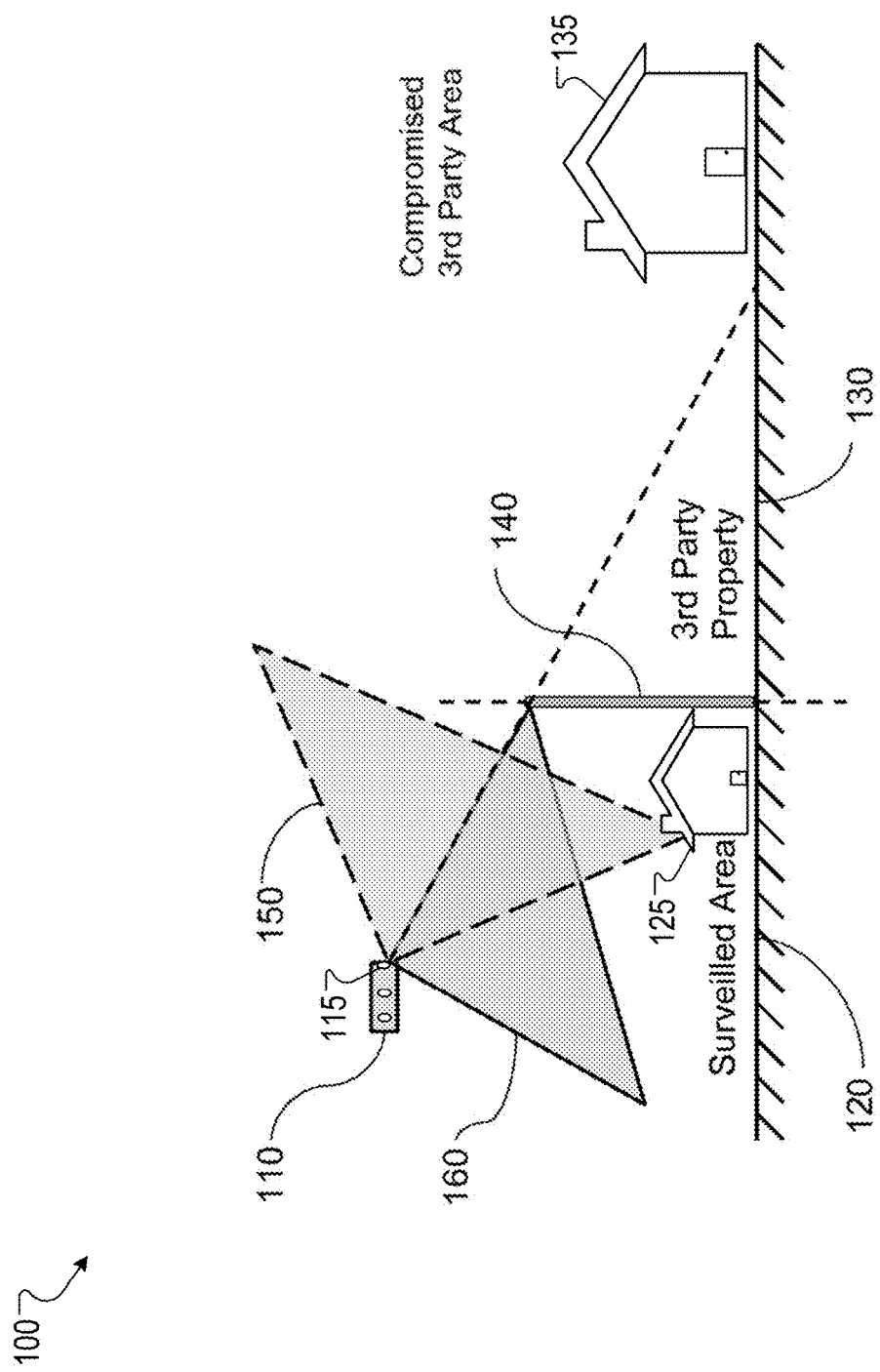
FIG. 1. shows an example of a system that includes an example drone used to implement privacy-aware surveillance.

FIG. 1. shows an example of a system 100 that includes a drone 110 used to implement privacy-aware surveillance for an example surveilled area. The drone 110 can represent an example security drone and the system 100 can represent an example security camera drone system.

In the present disclosure, an example area to be surveilled by a security camera drone may be referred to as a "surveilled area." The surveilled area 120 may be located next to, adjacent to, or within a threshold proximity of another area that includes (or is represented by) an example "third-party property." In some examples, the surveilled area 120 is referred to as a first area 120 and the other area 130 that includes the third-party property 135 is referred to as a second, different area 130, relative to the first area 120. In some other examples, an area (e.g., the surveilled area) includes multiple properties and a first property 125 to be surveilled or monitored using the drone may be referred to as a first section 120 of the area, whereas a second property 135 (e.g., third-party property) that is not being surveilled or monitored may be referred to as a second section of the area that is different than the first section.

A first property, section, or area to be surveilled may be owned by an entity or individual that is different than an entity or individual that owns a second, different property, section, or area that is not being surveilled. For example, a first property 125 being surveilled may have a different owner than an adjacent second property 135 that is not being surveilled. In some implementations, the property 125 is an item under surveillance, is represented by the first section 120, and is owned by a particular entity. Similarly, the property 135 can be represented by the section 130, and is owned by a different entity.

At least because of this difference in ownership, the owner of the property 125 being surveilled, including the owner or operator of the drone 110, may not have an interest in surveilling the other property 135. In some instances, the owner of the property 125 being surveilled may want to avoid viewing the other property 135 and/or capturing images or videos of the other property 135. In some cases, an owner of the other property 135 may have a privacy interest in that property, such that the owner of the other property 135 does not want a drone 110 capturing or recording images and video of the property.

The system 100 is configured to obtain or determine, as well as store, information about the surveilled area 120 and the third-party property 135. For example, the information can correspond to imagery data and video data that are obtained and then stored at the drone 110 for further processing. Although not shown in the example of FIG. 1, in addition to the drone 110, the system 100 may correspond to an example property monitoring system that includes one or more control units and a monitoring server. In some implementations, the data obtained using the drone 110 may be processed locally at the drone, remotely at the monitoring server, or both. This is described in more detail below with reference to the example of FIG. 5.

The system 100 is configured to determine a physical attribute of objects in an area. This area may be a large area that includes the smaller surveilled area/section 120 that has the property 125 and the other smaller area/section 130 that has the third-party property 135. An example object 140 may be located intermediate each of these first and second areas. The object 140 may define a boundary that separates property 125 and property 135. For example, the drone 110 may be configured to determine a height of an object 140 such as fence that is located between the surveilled area 120 and the other area 130 or the third-party property 135. The drone 110 can determine the attribute, height, or size of the fence or object at various points along the fence. In some implementations, the object 140 is a virtual object that is inserted as an overlay to define a boundary between the first section 120 and the second, different section 130.

The drone 110 can detect, recognize, and estimate the attributes (e.g., height) of the object 140 during an initial mapping of the surveilled area 120 or during a surveillance mission. For example, the drone 110 determines the attribute by using on-board imaging devices, such as cameras, and sensors. In some implementations, the drone 110 determines the attribute based on one or more algorithms that may be executed or implemented locally at the drone 110. Additionally or alternatively, an installer or operator of the drone 110 may provide the attribute of the object, such as a height along a perimeter of the area, as a manual input to drone 110. For example, the operator may provide the height input using an application program that is operable to push user inputs to the drone's on-board processors for local processing by the drone 110.

The drone 110 includes on-board circuitry that is coupled to the sensing/imaging devices installed at the drone, including hardware circuits and special-purpose processors such as processors that run machine-learning models that are implemented using trained neural networks. The on-board circuitry generates control signals that are routed to sensing, imaging, and/or data processing devices of the drone 110 to cause these devices to perform one or more functions. For example, the control signals can be used to control various functions of the drone 110, such as controlling a flight path of the drone or causing the imaging device 115 to obtain image data. In some implementations, the imaging device 115 obtains the image data based on control signals that are generated in accordance with an example mapping algorithm, an adjustment algorithm, or both.

Information obtained by system 100 can include sets of parameters relating to operations of various sensors 115 and/or devices 115 installed at the drone 110. For example, the sensors are operable to transmit signals (e.g., radio signals, optical signals, etc.) that can be used to control a flight path of the drone 110. To control its autonomous operations drone 110 can include a number of sensors or sensing devices 115. For example, the sensing devices 115 can include mono, stereo or time-of-flight (ToF) cameras, rangefinders, and other related devices. In some implementations, a sensor 115 installed at the drone 110 is a transceiver device is operable to transmit a radio (or optical) signal and to detect radio (or optical), including signals that are based on an earlier transmitted signal.

The parameters obtained by the system 100 may include information about the field-of-view ("FOV") of one or more cameras or imaging devices/sensors 115 of the drone 110. In some implementations, the system 100 determines the viewing angles based on an observed field-of-view of the camera 115. For example, the system 100 determines a respective field-of-view (FOV) of at least one camera 115 installed at the drone 110 and then determines a respective set of multiple viewing angles for each FOV observed for each camera.

In some implementations, the drone 110 parameters include an operating altitude range of the drone 110. In some other implementations, for one or more sets of parameters obtained for the on-board cameras and sensors 115, the system 100 is operable to obtain, determine, or otherwise derive information about sets of images or streams of video data that were captured for multiple different camera angles and with reference to different fields-of-views of the cameras.

In the example of FIG. 1 a drone 110 may hover above the surveilled area 120. As the drone hovers, an example default unadjusted pitch angle (e.g., a viewing angle) of the camera 115 is such that an example FOV 150 of an drone 110 camera allows the capture of the surveilled area 120 and a portion of the property 130. To decrease the amount of the property 130 in the FOV 150, the drone 110 (or system 100) implements one or more software algorithms to calculate a new pitch angle of the camera 115 and adjusts the camera 115 to the new pitch angle so that at least an upper boundary of an adjusted FOV 160 is aligned or positioned below a height of the object 140.

Figure 2:
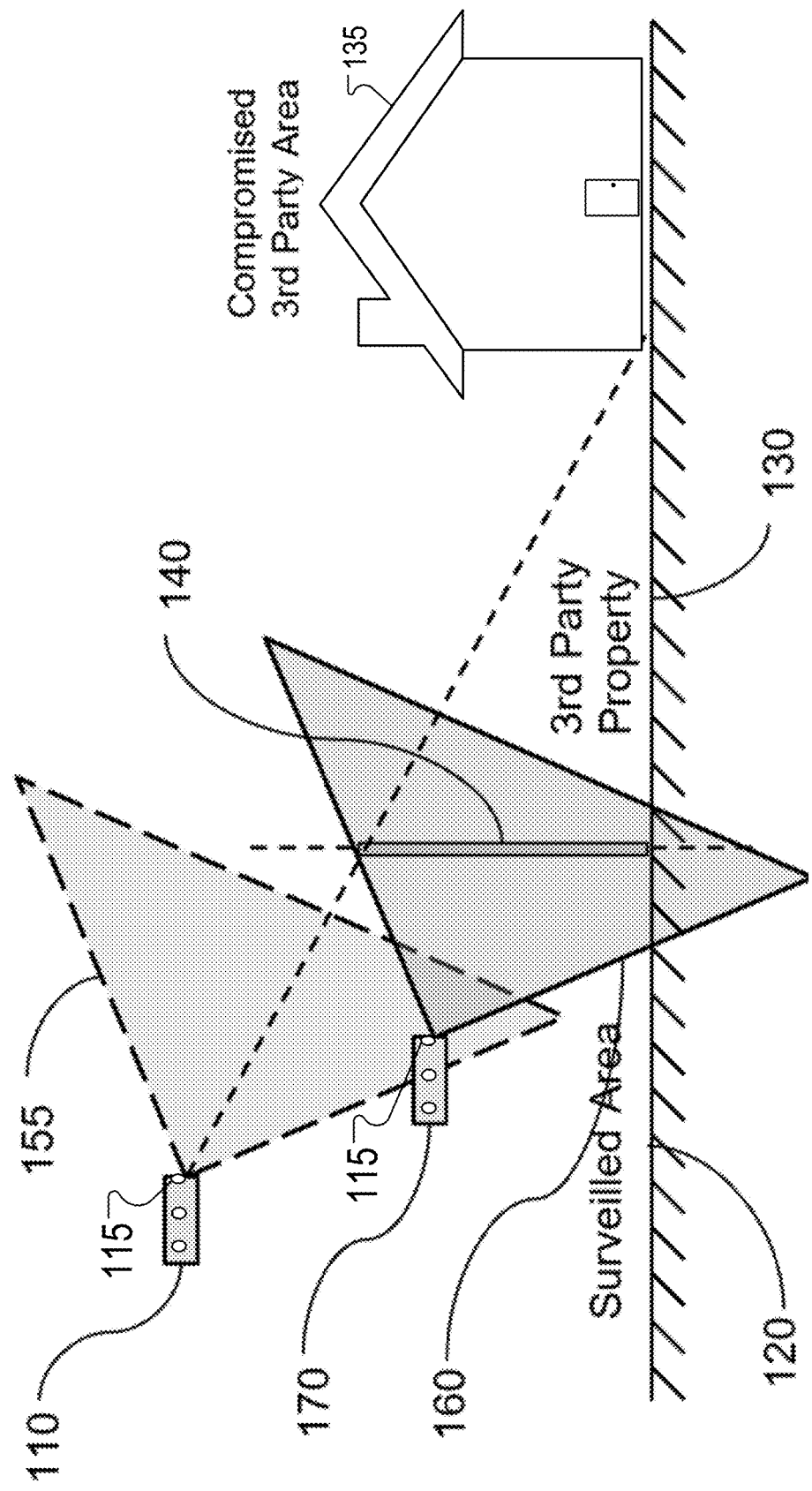
FIG. 2 shows an example drone adjusting one or more viewing angles of an imaging device installed at the drone.

FIG. 2 shows an example drone 110 adjusting one or more viewing angles of an imaging device 115 relative to different flight altitudes. To perform the surveillance, the drone 110 may fly above a particular level of an object 140 in the area. As described above, the object 140 may be an item such as a fence or physical boundary that separates the two properties 125, 135. The drone 110 may employ certain predefined or preset viewing angles or be positioned at a certain altitude that results in the drone capturing images and/or video of the adjacent property 135, including persons located at the other property.

In view of this, the techniques described in this document can be used to alleviate or mitigate privacy concerns related to improper or unauthorized surveillance of individuals and properties. For example, the imaging device and on-board circuitry of the drone are configured to dynamically adjust the altitude and viewing angles used by the drone to exclude images and video of the adjacent property from surveillance imagery obtained for the property being surveilled. Accordingly, the present disclosure describes methods that can be used to increase third-party privacy, for example, by adjusting the imaging angles of the drone or imaging device, as well as editing images or videos captured by the drone.

In some implementations, the drone 110 includes a multiple cameras, and each camera of the multiple cameras can represent a respective imaging device installed at the drone 110. The drone 110 is operable to obtain image data using the cameras and process the image data. In some implementations, processing the image data includes determining frame coverages for each of the multiple cameras installed at the drone 110. For example, when flying over the surveilled area 120, the drone 110 may dynamically calculate frame coverage of its cameras and/or sensors 115 and adjust the angle of the cameras and/or sensors 115 and the altitude of the drone 110 accordingly to decrease the amount of the property 130 that is viewable in a FOV.

Determining the frame coverages includes the drone 110 dynamically calculating a respective frame coverage for each of the multiple cameras installed at the drone 110. In some implementations, wherein each of the respective frame coverages are calculated concurrently as the image data is being obtained. The frame coverage can indicate an amount or type of items in the area that are included in a captured image or video frame. In some implementations, the system 100 determines an operating altitude of the drone 110, where the operating altitude corresponds to an altitude range that allows the drone to exclude the second, different section 130 of the area from being included in the surveillance imagery obtained by the drone 110. Based at least on the operating altitude, the system 100 is operable to control the drone 110 and sensors/imaging device 115 installed at the drone to exclude the section 130 from the surveillance imagery.

Additionally or alternatively, the drone 110 (or system 100) may be configured to adjust the position, orientation, and/or altitude of the drone 110 to reduce the amount of the property 135 in the FOV of the cameras 115 of the drone 110. In the example of FIG. 2, as the drone 110 is hovering or flying above the surveilled area 120, the drone 110 may use algorithms to calculate a new position 170 and reposition the drone 110 accordingly so that the upper boundary of the adjusted FOV 160 is aligned or positioned below the height of the object 140.

The system 100, including drone 110, calculates the new position 170 based on an adjustment algorithm that is implemented using the on-board circuitry of the drone as well as the imaging devices and sensors installed at the drone 110. In some implementations, the adjustment algorithm is an on-board viewing angle adjustment algorithm that is implemented using software instructions executed by a processor integrated in the on-board circuitry of the drone. The adjustment algorithm is described in more detail below with reference to FIG. 4.

Figure 3:
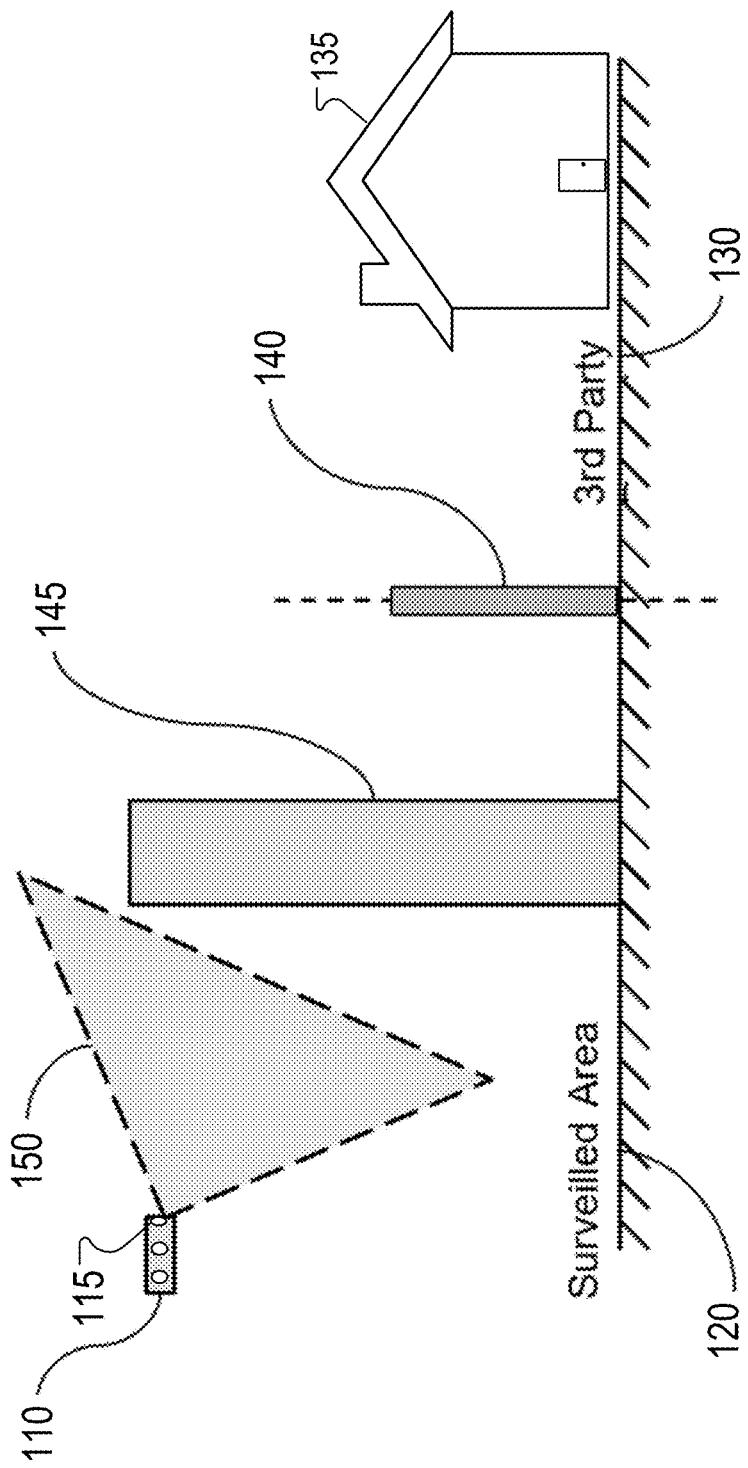
FIG. 3 shows an example of a drone performing surveillance of an object at an area or property.

FIG. 3 shows an example of a drone performing surveillance of an object 140 at an area or property. In some cases, the drone 110 may be configured to capture images and/or video of tall objects 145, for example, buildings that are located on the surveilled area 120. In such cases, it may be difficult to exclude property 135 from the FOV 150, and/or the frame of drone 110 cameras and/or sensors 115. In such cases, algorithms implemented at the drone 110 may be used to calculate and apply a digital mask over captured frames or images to render property 135 invisible or obscured. Additionally or alternatively, the drone 110 software algorithms may be configured to erase recorded images and/or video of the property 135.

Figure 4:
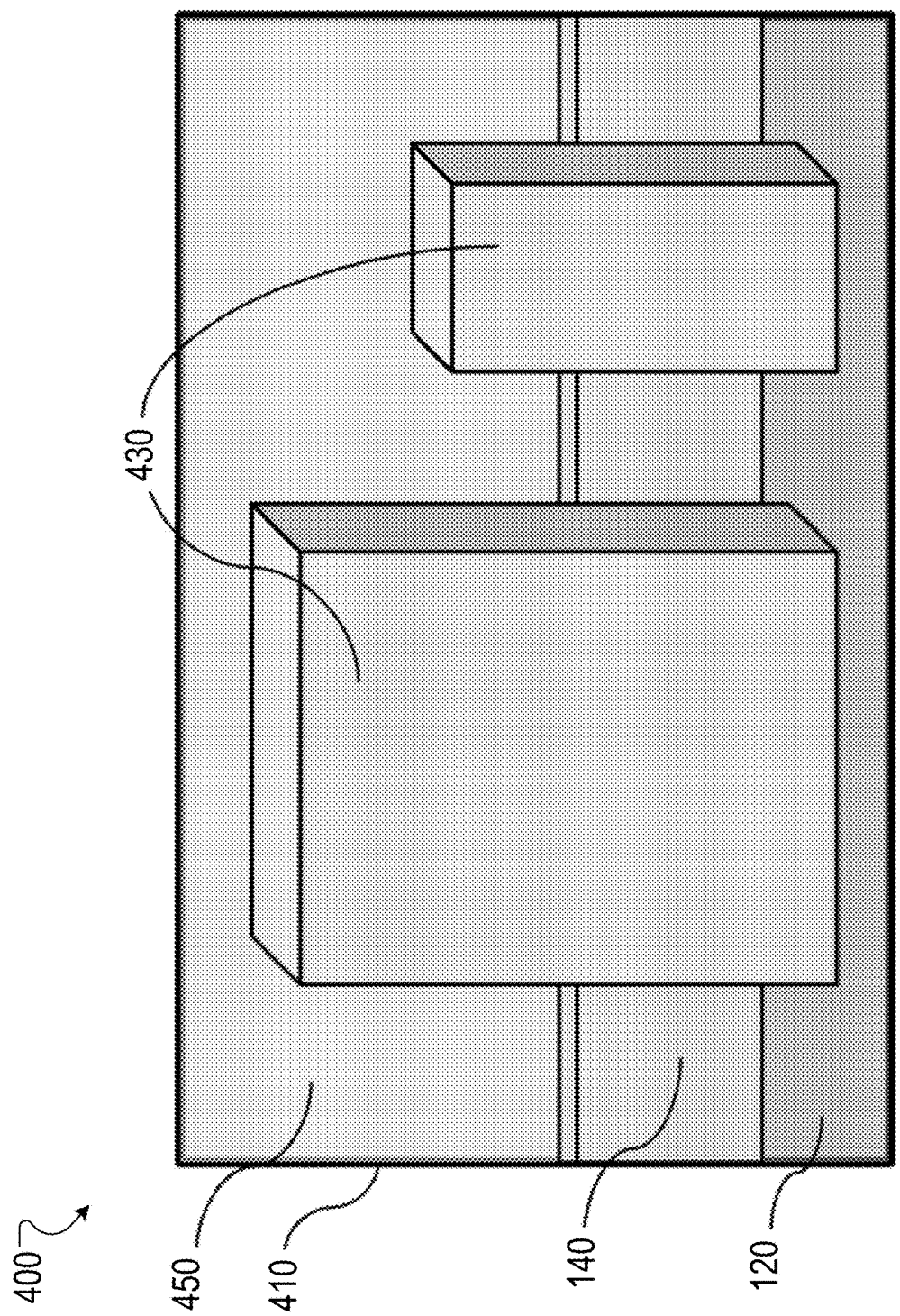
FIG. 4 shows an example of a frame that is captured using an imaging device installed at a drone.

FIG. 4 shows an example of a frame 400 that is captured using an imaging device installed at a drone. The software/adjustment algorithms implemented at the drone 110 can be used to determine which pixels in each captured frame boundary 410 correspond to one or more of: the surveilled area 120, surveilled objects/property 130, and/or the object 140 along the perimeter of the surveilled area.

The system 100 can process the pixilation data and pixel images values against the map of the area and based on the processing, determine that other pixels 450 in a given frame do not belong to the surveilled property, but rather potentially contain information about the property 130. Additionally or alternatively, the drone 110 may determine, based on an adjustment algorithm, which pixels of a given frame are part of the property 130 directly. In this manner, pixels potentially containing information about the property 130 may then be obscured, masked, or erased to decrease the amount of information about the third-party property 130 that is stored by the drone 110 or system 100.

The drone 110 is configured to compute, using the adjustment algorithms, determinations about the pixels based on the information about surveilled area perimeter as well as depth data (e.g., in the form of point-cloud) about the objects located inside the surveilled area 120, 130. The information about the surveilled areas and the depth data may be collected, for example, during initial mapping of the surveilled area as described above. In some implementations, information about the surveilled area may be provided by a user or installer of the drone 110. For example, an operator or installer may view images recorded by the drone 110 and select portions that are of the surveilled area and portions that are of the property 130.

In some other implementations, drone 110 is configured to use one or more machine-learning models to detect, classify, and/or identify objects in a frame and/or parts of the frame that belong to the surveilled area 120 as well as parts of the frame 400 that do not belong to the surveilled area 120. This information may be used to apply a mask to certain parts of the frame as described above with reference to FIG. 3.

Figure 5:
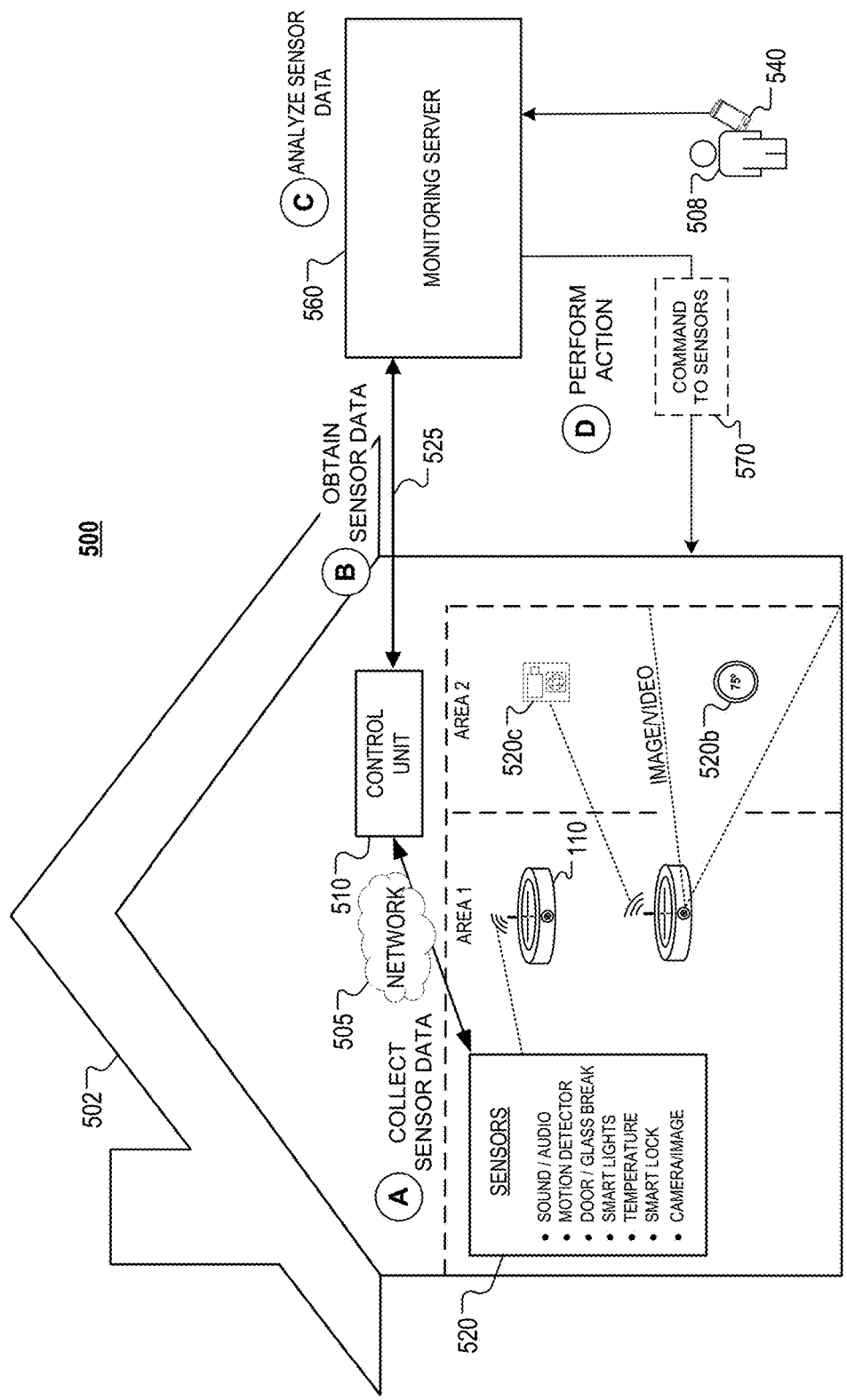
FIG. 5 shows a block diagram of an example property and property monitoring system that includes drones for monitoring conditions at the property.

FIG. 5 shows a block diagram of an example property and property monitoring system ("system 500") that includes drones for monitoring conditions at the property. The property 502 may be, for example, a residence, such as a single family home, a townhouse, a condominium, or an apartment. In some examples, the property 502 may be a commercial property, a place of business, or a public property, such as a police station, fire department, or military installation. The property 502 may correspond to the property 125 described above.

The system 500 can include multiple sensors 520. Each sensor 520 can be associated with various types of devices that are located at property 502. For example, a sensor(s) can be associated with contact sensor 520a that is operable to detect when a door or window is opened or closed. In some examples, a sensor can be a temperature control device 520b that is operable to control a temperature setting for an area or room at the property 502. Similarly, a sensor can be associated with a video or image recording device 520c located at the property 502, such as a digital camera or other electronic recording device.

As described above, the property 502, 125 is monitored by a property monitoring system. The property monitoring system includes a control unit 510 that sends sensor data 525, obtained using sensors 520, to a remote monitoring server 560. In some implementations, the control units, monitoring servers, or other computing modules described herein are included as sub-systems of the property monitoring system 500. Each of the sensors 520 can use various types of technology to transmit sensor signal data or to exchange data communications with devices of system 500 (or the property monitoring system). In some implementations, one or more sensors 520 at the property 502 can be at least one of: a Z-Wave enabled sensing device, a Bluetooth enabled sensing device, a Wi-Fi enabled sensing device, or a sensing device that uses radio or wireless signal technology. Additional sensor features are described in more detail below.

The system 500 also includes a drone 110 that is operable to generate image data which may be transmitted as sensor data 525 to the monitoring server 560. The image data can be processed at the monitoring server 560 to monitor and determine conditions at the property or to generate a layout or mapping of items or objects, including sensors 520, at the property 502. For example, a drone 110 can be used to survey the property 502 to determine whether items are secure at the property or to build a multi-dimensional map, such as a two-dimensional (2D) or three-dimensional (3D) model that includes 2D/3D map or physical layout of the property 502. In some implementations, the drone 110 surveys the property 502 and transmits parameters (or parameter values), sensor/drone data, and status information to the monitoring server 560 to determine conditions at the property or to generate the multi-dimensional map/model.

For example, the drone 110 is operable to transmit: (i) parameter signals that characterize a status or attribute of the items/objects, (ii) data that describes communications and interactions between the drone 110 and each of the sensors 520 or items at the property 502, and (iii) imagery data (e.g., "mapping data") about the property 502 to the monitoring server 560 to generate the multi-dimensional model. In some examples, the drone 110 interacts with the monitoring server 560 to determine the conditions concurrent with the drone 110 performing the survey of property 502.

The drone 110 are operable to receive commands 570 and other signals from the monitoring server 560 or from a client device 540 of a user 508. In some implementations, the command 570 is a data payload that includes instructions and data values for commanding the drone 110 to perform one or more specific functions at the property 502. For example, a command 570 can cause the drone 110 to travel to a particular area of the property 502, triggering of a particular sensor 520 at the property 502, or transmitting imagery or mapping data from the drone 110 to the monitoring server 560.

FIG. 6 shows an example process 600 for monitoring a property using a drone. The drone can correspond to an example drone described above, including a security drone or a security camera drone. Process 600 can be implemented or executed using the system 100, 400 described above. Descriptions of process 600 may reference the above-mentioned computing resources of system 100, 500. The steps or actions of process 600 may be enabled by programmed firmware, or software instructions, that are executable by one or more processors of the devices and resources described in this document. The process 600 can correspond to method for surveilling an area that includes two or more properties using a drone. In some implementations, the drone is a security camera drone and the steps of process 600 correspond to a method for performing privacy-aware surveillance with a security camera drone.

Referring now to process 600, the process includes obtaining image data using an imaging device installed at a drone (610). For example, the image data can be obtained by the camera/imaging device 115 for processing by a processor installed at on-board circuitry of the drone 110. In some implementations, the system 500 provides commands or control signals to the drone 110 to cause the camera/imaging device 115 to obtain (or capture) the image data. In some implementations, the process 600 includes one or more sensors transmitting signals that are used to control a flight path of the drone or operation associated with surveilling or monitoring a property in an area.

For example, an exterior sidewall of the drone 110 is configured to receive or support one or more sensors 115. The sensors may be represented by an imaging device 115 or an example transceiver 115 that includes a transmitter and a receiver for transmitting and detecting/receiving signals, respectively. In some implementations, the sensors 115 of the drone 110 are operable to transmit and receive signals based on commands or control signals received from the on-board circuitry of the drone, from the monitoring server 560 described above, or both.

In some cases, the monitoring server 560 of system 500 provides commands to the drone 110 to cause the sensors 115 to transmit and receive signals for controlling imaging functions of the drone 110, controlling a flight path of the drone 110, or both. The signals can be radio signals, optical signals, or various other types of signals that can be used to control the flight path of drone 110 as well as to control viewing angles of cameras or imaging devices installed at the drone. The sensors 115 may be designed or configured to include the components and circuitry required to transmit and detect one or more of the different types of signals that can be used to control the drone 110.

Process 600 includes processing at least the image data to detect one or more objects that are external to the drone (620). For example, the image data, including other sensor data collected by the drone 110, is processed using the on-board circuitry of the drone 110, the monitoring server 560, or both. For example, the data may be processed locally at the drone 110 to control a specific operation performed by the drone, or remotely at an example control engine of the monitoring server 560. The image data and other sensor data are processed to detect objects that are external to the drone during aerial maneuvering of the drone 330 or when the drone travels around a property to monitor conditions items and objects at the property.

In response to processing the image data, the drone 110 identifies or determines different viewing angles that are indicated in the image data with respect to the object (630). For example, the drone 110 can identify or determine the viewing angles based on parameters or settings of the imaging lens of the cameras used to capture the images. In some implementations, the drone determines the viewing angles at least by using image recognition to identify the object and other items in an image, processing information about the objects/items (e.g., positional/coordinate data for the objects) against a map of the area, and then determine the viewing angles based on the processing.

Based on the image data and the multiple viewing angles, the drone 110 identifies a first section of the area for surveillance and a second, different section of the area to be excluded from surveillance (640). For example, the drone 110 can identify the first section 120 that includes property 125 as a section of the area that requires surveillances and can identify the second section 130 that includes property 135 as a section of the area that is to be excluded from surveillance. In some implementations, the drone 110 can identify the different sections based on at least one user inputs that are processed against the images of the viewing angles, the mapping of the area, or both.

The drone 110 determines an adjustment to at least one of the multiple viewing angles to cause the second, different section 130 of the area to be excluded from surveillance imagery obtained by the drone (650). For example, the drone 110 can determine the adjustment to one or more one of the multiple viewing angles at least by selecting a first viewing angle among the multiple viewing angles, calculating a new viewing angle that decreases an amount of the section 130 that is viewable from the first viewing angle, and determining the adjustment based on the new viewing angle.

In some implementations, the drone 110 may perform a similar calculation for each of multiple viewing angles. The new angle is used to adjust an angle of the camera 115 to a new pitch angle so that at least an upper boundary of an adjusted FOV 160 is aligned or positioned below a height of the object 140. Based on the adjustment, the drone 110 controls the imaging device installed at the drone to exclude the second, different section 130 of the area from surveillance imagery obtained by the drone (660).

Figure 7:
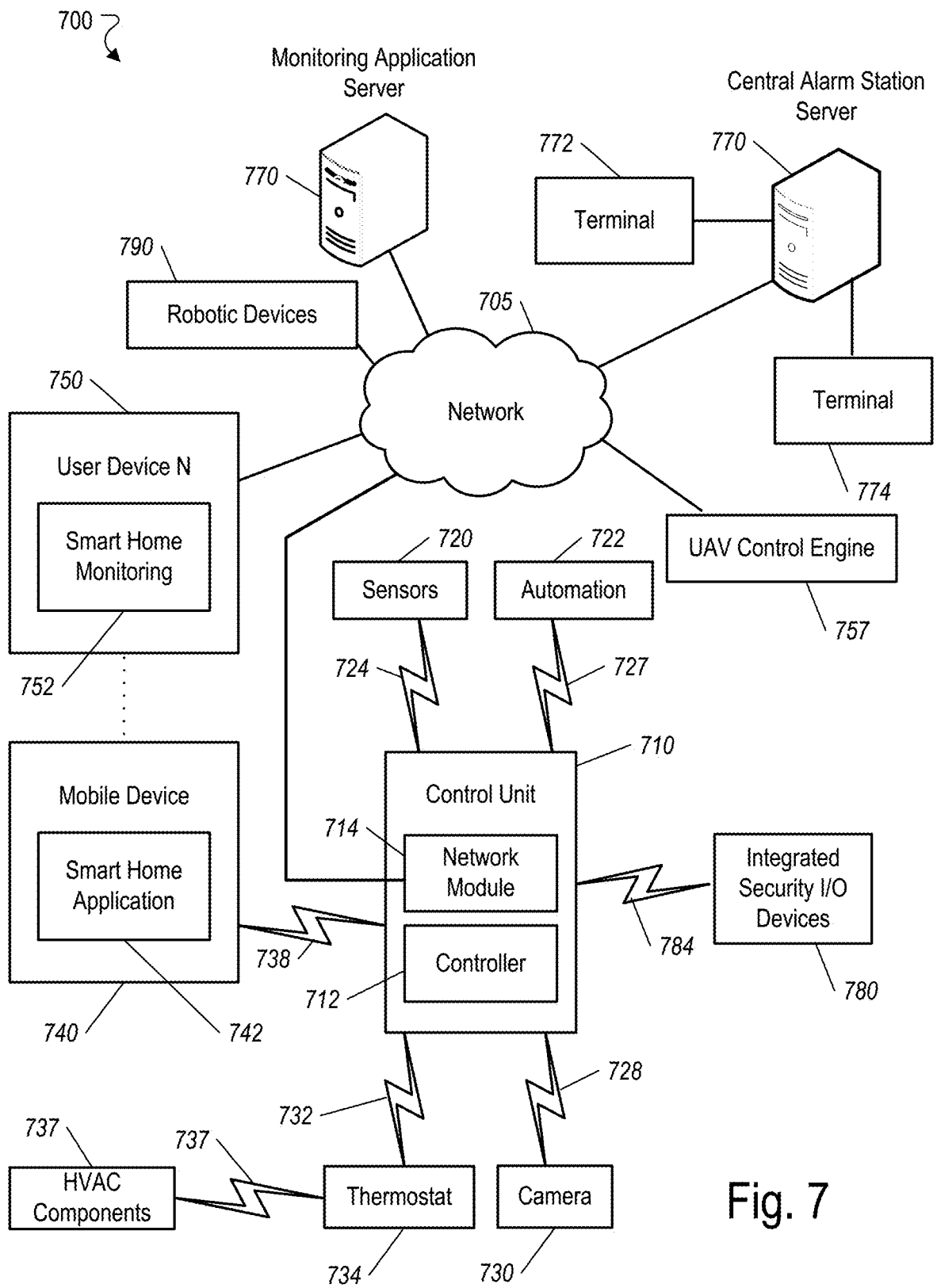
FIG. 7 shows a diagram illustrating an example property monitoring system.

FIG. 7 is a diagram illustrating an example of a property monitoring system 700. The electronic system 700 includes a network 705, a control unit 710, one or more user devices 740 and 750, a monitoring server 760, and a central alarm station server 770. In some examples, the network 705 facilitates communications between the control unit 710, the one or more user devices 740 and 750, the monitoring server 760, and the central alarm station server 770.

The network 705 is configured to enable exchange of electronic communications between devices connected to the network 705. For example, the network 705 may be configured to enable exchange of electronic communications between the control unit 710, the one or more user devices 740 and 750, the monitoring server 760, and the central alarm station server 770. The network 705 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 705 may include multiple networks or subnetworks, each of which may include, for example, a wired or wireless data pathway. The network 705 may include a circuit-switched network, a packet-switched data network, or any other network able to carry electronic communications (e.g., data or voice communications). For example, the network 705 may include networks based on the Internet protocol (IP), asynchronous transfer mode (ATM), the PSTN, packet-switched networks based on IP, x.25, or Frame Relay, or other comparable technologies and may support voice using, for example, VoIP, or other comparable protocols used for voice communications. The network 705 may include one or more networks that include wireless data channels and wireless voice channels. The network 705 may be a wireless network, a broadband network, or a combination of networks including a wireless network and a broadband network.

The control unit 710 includes a controller 712 and a network module 714. The controller 712 is configured to control a control unit monitoring system (e.g., a control unit system) that includes the control unit 710. In some examples, the controller 712 may include a processor or other control circuitry configured to execute instructions of a program that controls operation of a control unit system. In these examples, the controller 712 may be configured to receive input from sensors, flow meters, or other devices included in the control unit system and control operations of devices included in the household (e.g., speakers, lights, doors, etc.). For example, the controller 712 may be configured to control operation of the network module 714 included in the control unit 710.

The network module 714 is a communication device configured to exchange communications over the network 705. The network module 714 may be a wireless communication module configured to exchange wireless communications over the network 705. For example, the network module 714 may be a wireless communication device configured to exchange communications over a wireless data channel and a wireless voice channel. In this example, the network module 714 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 714 also may be a wired communication module configured to exchange communications over the network 705 using a wired connection. For instance, the network module 714 may be a modem, a network interface card, or another type of network interface device. The network module 714 may be an Ethernet network card configured to enable the control unit 710 to communicate over a local area network and/or the Internet. The network module 714 also may be a voice band modem configured to enable the alarm panel to communicate over the telephone lines of Plain Old Telephone Systems (POTS).

The control unit system that includes the control unit 710 includes one or more sensors. For example, the monitoring system may include multiple sensors 720. The sensors 720 may include a lock sensor, a contact sensor, a motion sensor, or any other type of sensor included in a control unit system. The sensors 720 also may include an environmental sensor, such as a temperature sensor, a water sensor, a rain sensor, a wind sensor, a light sensor, a smoke detector, a carbon monoxide detector, an air quality sensor, etc. The sensors 720 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 720 can also include a radio-frequency identification (RFID) sensor that identifies a particular article that includes a pre-assigned RFID tag.

The control unit 710 communicates with the home automation controls 722 and a camera 730 to perform monitoring. The home automation controls 722 are connected to one or more devices that enable automation of actions in the home. For instance, the home automation controls 722 may be connected to one or more lighting systems and may be configured to control operation of the one or more lighting systems. Also, the home automation controls 722 may be connected to one or more electronic locks at the home and may be configured to control operation of the one or more electronic locks (e.g., control Z-Wave locks using wireless communications in the Z-Wave protocol). Further, the home automation controls 722 may be connected to one or more appliances at the home and may be configured to control operation of the one or more appliances. The home automation controls 722 may include multiple modules that are each specific to the type of device being controlled in an automated manner. The home automation controls 722 may control the one or more devices based on commands received from the control unit 710. For instance, the home automation controls 722 may cause a lighting system to illuminate an area to provide a better image of the area when captured by a camera 730.

The camera 730 may be a video/photographic camera or other type of optical sensing device configured to capture images. For instance, the camera 730 may be configured to capture images of an area within a building or home monitored by the control unit 710. The camera 730 may be configured to capture single, static images of the area and also video images of the area in which multiple images of the area are captured at a relatively high frequency (e.g., thirty images per second). The camera 730 may be controlled based on commands received from the control unit 710.

The camera 730 may be triggered by several different types of techniques. For instance, a Passive Infra-Red (PIR) motion sensor may be built into the camera 730 and used to trigger the camera 730 to capture one or more images when motion is detected. The camera 730 also may include a microwave motion sensor built into the camera and used to trigger the camera 730 to capture one or more images when motion is detected. The camera 730 may have a "normally open" or "normally closed" digital input that can trigger capture of one or more images when external sensors (e.g., the sensors 720, PIR, door/window, etc.) detect motion or other events. In some implementations, the camera 730 receives a command to capture an image when external devices detect motion or another potential alarm event. The camera 730 may receive the command from the controller 712 or directly from one of the sensors 720.

In some examples, the camera 730 triggers integrated or external illuminators (e.g., Infra-Red, Z-wave controlled "white" lights, lights controlled by the home automation controls 722, etc.) to improve image quality when the scene is dark. An integrated or separate light sensor may be used to determine if illumination is desired and may result in increased image quality.

The camera 730 may be programmed with any combination of time/day schedules, system "arming state", or other variables to determine whether images should be captured or not when triggers occur. The camera 730 may enter a low-power mode when not capturing images. In this case, the camera 730 may wake periodically to check for inbound messages from the controller 712. The camera 730 may be powered by internal, replaceable batteries if located remotely from the control unit 710. The camera 730 may employ a small solar cell to recharge the battery when light is available. Alternatively, the camera 730 may be powered by the controller's 712 power supply if the camera 730 is co-located with the controller 712.

In some implementations, the camera 730 communicates directly with the monitoring server 760 over the Internet. In these implementations, image data captured by the camera 730 does not pass through the control unit 710 and the camera 730 receives commands related to operation from the monitoring server 760.

The system 700 also includes thermostat 734 to perform dynamic environmental control at the home. The thermostat 734 is configured to monitor temperature and/or energy consumption of an HVAC system associated with the thermostat 734, and is further configured to provide control of environmental (e.g., temperature) settings. In some implementations, the thermostat 734 can additionally or alternatively receive data relating to activity at a home and/or environmental data at a home, e.g., at various locations indoors and outdoors at the home. The thermostat 734 can directly measure energy consumption of the HVAC system associated with the thermostat, or can estimate energy consumption of the HVAC system associated with the thermostat 734, for example, based on detected usage of one or more components of the HVAC system associated with the thermostat 734. The thermostat 734 can communicate temperature and/or energy monitoring information to or from the control unit 710 and can control the environmental (e.g., temperature) settings based on commands received from the control unit 710.

In some implementations, the thermostat 734 is a dynamically programmable thermostat and can be integrated with the control unit 710. For example, the dynamically programmable thermostat 734 can include the control unit 710, e.g., as an internal component to the dynamically programmable thermostat 734. In addition, the control unit 710 can be a gateway device that communicates with the dynamically programmable thermostat 734. In some implementations, the thermostat 734 is controlled via one or more home automation controls 722.

A module 737 is connected to one or more components of an HVAC system associated with a home, and is configured to control operation of the one or more components of the HVAC system. In some implementations, the module 737 is also configured to monitor energy consumption of the HVAC system components, for example, by directly measuring the energy consumption of the HVAC system components or by estimating the energy usage of the one or more HVAC system components based on detecting usage of components of the HVAC system. The module 737 can communicate energy monitoring information 576 and the state of the HVAC system components to the thermostat 734 and can control the one or more components of the HVAC system based on commands received from the thermostat 734.

The system 700 includes one or more UAV control engines 757. Each of the one or more UAV control engine 757 connects to control unit 710, e.g., through network 705. The UAV control engines 757 can be computing devices (e.g., a computer, microcontroller, FPGA, ASIC, or other device capable of electronic computation) capable of receiving data related to the sensors 720 and communicating electronically with the monitoring system control unit 710 and monitoring server 760. In some implementations, the sensors 720 correspond to the sensors or an imaging device (e.g., a camera) that is installed in an example drone, such as in the internal cavity of a frame of the drone.

The UAV control engine 757 receives data from one or more sensors 720. In some examples, the UAV control engine 757 can be used to control a drone at the property 502. The UAV control engine 757 can be used to control a flight path of the drone based on data generated by sensors 720, e.g., data from sensor 720 describing motion, movement, acceleration/velocity, orientation, and other parameters, pertaining to a drone used to monitor conditions at the property 502. The UAV control engine 757 can receive data from the one or more sensors 720 through any combination of wired and/or wireless data links. For example, the UAV control engine 757 can receive sensor data via a Bluetooth, Bluetooth LE, Z-wave, or Zigbee data link.

The UAV control engine 757 communicates electronically with the control unit 710. For example, the UAV control engine 757 can send data related to the sensors 720 to the control unit 710 and receive commands related to determining a state of a drone at the property 502 and a flight path of the drone based on data from the sensors 720. In some examples, the UAV control engine 757 processes or generates sensor signal data, for signals emitted by the sensors 720, prior to sending it to the control unit 710. The sensor signal data can include information that indicates a user 508 has interacted with a drone at the property or is using a drone to monitor items at the property.

In some examples, the system 700 further includes one or more robotic devices 790. The robotic devices 790 may be any type of robots that are capable of moving and taking actions that assist in home monitoring. For example, the robotic devices 790 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 790 may be devices that are intended for other purposes and merely associated with the system 700 for use in appropriate circumstances. For instance, a robotic vacuum cleaner device may be associated with the monitoring system 700 as one of the robotic devices 790 and may be controlled to take action responsive to monitoring system events.

In some examples, the robotic devices 790 automatically navigate within a home. In these examples, the robotic devices 790 include sensors and control processors that guide movement of the robotic devices 790 within the home. For instance, the robotic devices 790 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 790 may include control processors that process output from the various sensors and control the robotic devices 790 to move along a path that reaches the desired destination and avoids obstacles. In this regard, the control processors detect walls or other obstacles in the home and guide movement of the robotic devices 790 in a manner that avoids the walls and other obstacles.

In addition, the robotic devices 790 may store data that describes attributes of the home. For instance, the robotic devices 790 may store a floorplan and/or a three-dimensional model of the home that enables the robotic devices 790 to navigate the home. During initial configuration, the robotic devices 790 may receive the data describing attributes of the home, determine a frame of reference to the data (e.g., a home or reference location in the home), and navigate the home based on the frame of reference and the data describing attributes of the home. Further, initial configuration of the robotic devices 790 also may include learning of one or more navigation patterns in which a user provides input to control the robotic devices 790 to perform a specific navigation action (e.g., fly to an upstairs bedroom and spin around while capturing video and then return to a home charging base). In this regard, the robotic devices 790 may learn and store the navigation patterns such that the robotic devices 790 may automatically repeat the specific navigation actions upon a later request.

In some examples, the robotic devices 790 may include data capture and recording devices. In these examples, the robotic devices 790 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 790 to take and store a biometric sample that can be used to identify the person (e.g., a biometric sample with DNA that can be used for DNA testing).

In some implementations, the robotic devices 790 may include output devices. In these implementations, the robotic devices 790 may include one or more displays, one or more speakers, and/or any type of output devices that allow the robotic devices 790 to communicate information to a nearby user.

The robotic devices 790 also may include a communication module that enables the robotic devices 790 to communicate with the control unit 710, each other, and/or other devices. The communication module may be a wireless communication module that allows the robotic devices 790 to communicate wirelessly. For instance, the communication module may be a Wi-Fi module that enables the robotic devices 790 to communicate over a local wireless network at the home. The communication module further may be a 900 MHz wireless communication module that enables the robotic devices 790 to communicate directly with the control unit 710. Other types of short-range wireless communication protocols, such as Bluetooth, Bluetooth LE, Z-wave, Zigbee, etc., may be used to allow the robotic devices 790 to communicate with other devices in the home. In some implementations, the robotic devices 790 may communicate with each other or with other devices of the system 700 through the network 705.

The robotic devices 790 further may include processor and storage capabilities. The robotic devices 790 may include any suitable processing devices that enable the robotic devices 790 to operate applications and perform the actions described throughout this disclosure. In addition, the robotic devices 790 may include solid state electronic storage that enables the robotic devices 790 to store applications, configuration data, collected sensor data, and/or any other type of information available to the robotic devices 790.

The robotic devices 790 are associated with one or more charging stations. The charging stations may be located at predefined home base or reference locations in the home. The robotic devices 790 may be configured to navigate to the charging stations after completion of tasks needed to be performed for the monitoring system 700. For instance, after completion of a monitoring operation or upon instruction by the control unit 710, the robotic devices 790 may be configured to automatically fly to and land on one of the charging stations. In this regard, the robotic devices 790 may automatically maintain a fully charged battery in a state in which the robotic devices 790 are ready for use by the monitoring system 700.

The charging stations may be contact based charging stations and/or wireless charging stations. For contact based charging stations, the robotic devices 790 may have readily accessible points of contact that the robotic devices 790 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 790 may charge through a wireless exchange of power. In these cases, the robotic devices 790 need only locate themselves closely enough to the wireless charging stations for the wireless exchange of power to occur. In this regard, the positioning needed to land at a predefined home base or reference location in the home may be less precise than with a contact based charging station. Based on the robotic devices 790 landing at a wireless charging station, the wireless charging station outputs a wireless signal that the robotic devices 790 receive and convert to a power signal that charges a battery maintained on the robotic devices 790.

In some implementations, each of the robotic devices 790 has a corresponding and assigned charging station such that the number of robotic devices 790 equals the number of charging stations. In these implementations, the robotic devices 790 always navigate to the specific charging station assigned to that robotic device. For instance, a first robotic device may always use a first charging station and a second robotic device may always use a second charging station.

In some examples, the robotic devices 790 may share charging stations. For instance, the robotic devices 790 may use one or more community charging stations that are capable of charging multiple robotic devices 790. The community charging station may be configured to charge multiple robotic devices 790 in parallel. The community charging station may be configured to charge multiple robotic devices 790 in serial such that the multiple robotic devices 790 take turns charging and, when fully charged, return to a predefined home base or reference location in the home that is not associated with a charger. The number of community charging stations may be less than the number of robotic devices 790.

Also, the charging stations may not be assigned to specific robotic devices 790 and may be capable of charging any of the robotic devices 790. In this regard, the robotic devices 790 may use any suitable, unoccupied charging station when not in use. For instance, when one of the robotic devices 790 has completed an operation or is in need of battery charge, the control unit 710 references a stored table of the occupancy status of each charging station and instructs the robotic device to navigate to the nearest charging station that is unoccupied.

The system 700 further includes one or more integrated security devices 780. The one or more integrated security devices may include any type of device used to provide alerts based on received sensor data. For instance, the one or more control units 710 may provide one or more alerts to the one or more integrated security input/output devices 780. Additionally, the one or more control units 710 may receive one or more sensor data from the sensors 720 and determine whether to provide an alert to the one or more integrated security input/output devices 780.

The sensors 720, the home automation controls 722, the camera 730, the thermostat 734, and the integrated security devices 780 may communicate with the controller 712 over communication links 724, 726, 728, 732, 738, 736, and 784. The communication links 724, 726, 728, 732, 738, and 784 may be a wired or wireless data pathway configured to transmit signals from the sensors 720, the home automation controls 722, the camera 730, the thermostat 734, and the integrated security devices 780 to the controller 712. The sensors 720, the home automation controls 722, the camera 730, the thermostat 734, and the integrated security devices 780 may continuously transmit sensed values to the controller 712, periodically transmit sensed values to the controller 712, or transmit sensed values to the controller 712 in response to a change in a sensed value.

The communication links 724, 726, 728, 732, 738, and 784 may include a local network. The sensors 720, the home automation controls 722, the camera 730, the thermostat 734, and the integrated security devices 780, and the controller 712 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 760 is an electronic device configured to provide monitoring services by exchanging electronic communications with the control unit 710, the one or more user devices 740 and 750, and the central alarm station server 770 over the network 705. For example, the monitoring server 760 may be configured to monitor events (e.g., alarm events) generated by the control unit 710. In this example, the monitoring server 760 may exchange electronic communications with the network module 714 included in the control unit 710 to receive information regarding events (e.g., alerts) detected by the control unit 710. The monitoring server 760 also may receive information regarding events (e.g., alerts) from the one or more user devices 740 and 750.

In some examples, the monitoring server 760 may route alert data received from the network module 714 or the one or more user devices 740 and 750 to the central alarm station server 770. For example, the monitoring server 760 may transmit the alert data to the central alarm station server 770 over the network 705.

The monitoring server 760 may store sensor and image data received from the monitoring system and perform analysis of sensor and image data received from the monitoring system. Based on the analysis, the monitoring server 760 may communicate with and control aspects of the control unit 710 or the one or more user devices 740 and 750.

The monitoring server 760 may provide various monitoring services to the system 700. For example, the monitoring server 760 may analyze the sensor, image, and other data to determine an activity pattern of a resident of the home monitored by the system 700. In some implementations, the monitoring server 760 may analyze the data for alarm conditions or may determine and perform actions at the home by issuing commands to one or more of the controls 722, possibly through the control unit 710.

The central alarm station server 770 is an electronic device configured to provide alarm monitoring service by exchanging communications with the control unit 710, the one or more mobile devices 740 and 750, and the monitoring server 760 over the network 705. For example, the central alarm station server 770 may be configured to monitor alerting events generated by the control unit 710. In this example, the central alarm station server 770 may exchange communications with the network module 714 included in the control unit 710 to receive information regarding alerting events detected by the control unit 710. The central alarm station server 770 also may receive information regarding alerting events from the one or more mobile devices 740 and 750 and/or the monitoring server 760.

The central alarm station server 770 is connected to multiple terminals 772 and 774. The terminals 772 and 774 may be used by operators to process alerting events. For example, the central alarm station server 770 may route alerting data to the terminals 772 and 774 to enable an operator to process the alerting data. The terminals 772 and 774 may include general-purpose computers (e.g., desktop personal computers, workstations, or laptop computers) that are configured to receive alerting data from a server in the central alarm station server 770 and render a display of information based on the alerting data. For instance, the controller 712 may control the network module 714 to transmit, to the central alarm station server 770, alerting data indicating that a sensor 720 detected motion from a motion sensor via the sensors 720. The central alarm station server 770 may receive the alerting data and route the alerting data to the terminal 772 for processing by an operator associated with the terminal 772. The terminal 772 may render a display to the operator that includes information associated with the alerting event (e.g., the lock sensor data, the motion sensor data, the contact sensor data, etc.) and the operator may handle the alerting event based on the displayed information.

In some implementations, the terminals 772 and 774 may be mobile devices or devices designed for a specific function. Although FIG. 7 illustrates two terminals for brevity, actual implementations may include more (and, perhaps, many more) terminals.

The one or more authorized user devices 740 and 750 are devices that host and display user interfaces. For instance, the user device 740 is a mobile device that hosts or runs one or more native applications (e.g., the smart home application 742). The user device 740 may be a cellular phone or a non-cellular locally networked device with a display. The user device 740 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 740 may perform functions unrelated to the monitoring system, such as placing personal telephone calls, playing music, playing video, displaying pictures, browsing the Internet, maintaining an electronic calendar, etc.

The user device 740 includes a smart home application 742. The smart home application 742 refers to a software/firmware program running on the corresponding mobile device that enables the user interface and features described throughout. The user device 740 may load or install the smart home application 742 based on data received over a network or data received from local media. The smart home application 742 runs on mobile devices platforms, such as iPhone, iPod touch, Blackberry, Google Android, Windows Mobile, etc. The smart home application 742 enables the user device 740 to receive and process image and sensor data from the monitoring system.

The user device 750 may be a general-purpose computer (e.g., a desktop personal computer, a workstation, or a laptop computer) that is configured to communicate with the monitoring server 760 and/or the control unit 710 over the network 705. The user device 750 may be configured to display a smart home user interface 752 that is generated by the user device 750 or generated by the monitoring server 760. For example, the user device 750 may be configured to display a user interface (e.g., a web page) provided by the monitoring server 760 that enables a user to perceive images captured by the camera 730 and/or reports related to the monitoring system. Although FIG. 5 illustrates two user devices for brevity, actual implementations may include more (and, perhaps, many more) or fewer user devices.

In some implementations, the one or more user devices 740 and 750 communicate with and receive monitoring system data from the control unit 710 using the communication link 738. For instance, the one or more user devices 740 and 750 may communicate with the control unit 710 using various local wireless protocols such as Wi-Fi, Bluetooth, Z-wave, Zigbee, HomePlug (ethernet over power line), or wired protocols such as Ethernet and USB, to connect the one or more user devices 740 and 750 to local security and automation equipment. The one or more user devices 740 and 750 may connect locally to the monitoring system and its sensors and other devices. The local connection may improve the speed of status and control communications because communicating through the network 705 with a remote server (e.g., the monitoring server 760) may be significantly slower.

Although the one or more user devices 740 and 750 are shown as communicating with the control unit 710, the one or more user devices 740 and 750 may communicate directly with the sensors and other devices controlled by the control unit 710. In some implementations, the one or more user devices 740 and 750 replace the control unit 710 and perform the functions of the control unit 710 for local monitoring and long range/offsite communication.

In other implementations, the one or more user devices 740 and 750 receive monitoring system data captured by the control unit 710 through the network 705. The one or more user devices 740, 750 may receive the data from the control unit 710 through the network 705 or the monitoring server 760 may relay data received from the control unit 710 to the one or more user devices 740 and 750 through the network 705. In this regard, the monitoring server 760 may facilitate communication between the one or more user devices 740 and 750 and the monitoring system.

In some implementations, the one or more user devices 740 and 750 may be configured to switch whether the one or more user devices 740 and 750 communicate with the control unit 710 directly (e.g., through link 738) or through the monitoring server 760 (e.g., through network 705) based on a location of the one or more user devices 740 and 750. For instance, when the one or more user devices 740 and 750 are located close to the control unit 710 and in range to communicate directly with the control unit 710, the one or more user devices 740 and 750 use direct communication. When the one or more user devices 740 and 750 are located far from the control unit 710 and not in range to communicate directly with the control unit 710, the one or more user devices 740 and 750 use communication through the monitoring server 760.

Although the one or more user devices 740 and 750 are shown as being connected to the network 705, in some implementations, the one or more user devices 740 and 750 are not connected to the network 705. In these implementations, the one or more user devices 740 and 750 communicate directly with one or more of the monitoring system components and no network (e.g., Internet) connection or reliance on remote servers is needed.

In some implementations, the one or more user devices 740 and 750 are used in conjunction with only local sensors and/or local devices in a house. In these implementations, the system 700 includes the one or more user devices 740 and 750, the sensors 720, the home automation controls 722, the camera 730, the robotic devices 790, and the UAV control engine 757. The one or more user devices 740 and 750 receive data directly from the sensors 720, the home automation controls 722, the camera 730, the robotic devices 790, and the UAV control engine 757 and sends data directly to the sensors 720, the home automation controls 722, the camera 730, the robotic devices 790, and the UAV control engine 757. The one or more user devices 740, 750 provide the appropriate interfaces/processing to provide visual surveillance and reporting.

In other implementations, the system 700 further includes network 705 and the sensors 720, the home automation controls 722, the camera 730, the thermostat 734, the robotic devices 790, and the UAV control engine 757 are configured to communicate sensor and image data to the one or more user devices 740 and 750 over network 705 (e.g., the Internet, cellular network, etc.). In yet another implementation, the sensors 720, the home automation controls 722, the camera 730, the thermostat 734, the robotic devices 790, and the UAV control engine 757 (or a component, such as a bridge/router) are intelligent enough to change the communication pathway from a direct local pathway when the one or more user devices 740 and 750 are in close physical proximity to the sensors 720, the home automation controls 722, the camera 730, the thermostat 734, the robotic devices 790, and the UAV control engine 757 to a pathway over network 705 when the one or more user devices 740 and 750 are farther from the sensors 720, the home automation controls 722, the camera 730, the thermostat 734, the robotic devices 790, and the control engine.

In some examples, the system leverages GPS information from the one or more user devices 740 and 750 to determine whether the one or more user devices 740 and 750 are close enough to the sensors 720, the home automation controls 722, the camera 730, the thermostat 734, the robotic devices 790, and the UAV control engine 757 to use the direct local pathway or whether the one or more user devices 740 and 750 are far enough from the sensors 720, the home automation controls 722, the camera 730, the thermostat 734, the robotic devices 790, and the UAV control engine 757 that the pathway over network 705 is required.

In other examples, the system leverages status communications (e.g., pinging) between the one or more user devices 740 and 750 and the sensors 720, the home automation controls 722, the camera 730, the thermostat 734, the robotic devices 790, and the UAV control engine 757 to determine whether communication using the direct local pathway is possible. If communication using the direct local pathway is possible, the one or more user devices 740 and 750 communicate with the sensors 720, the home automation controls 722, the camera 730, the thermostat 734, the robotic devices 790, and the UAV control engine 757 using the direct local pathway. If communication using the direct local pathway is not possible, the one or more user devices 740 and 750 communicate with the sensors 720, the home automation controls 722, the camera 730, the thermostat 734, the robotic devices 790, and the UAV control engine 757 using the pathway over network 705.

In some implementations, the system 700 provides end users with access to images captured by the camera 730 to aid in decision making. The system 700 may transmit the images captured by the camera 730 over a wireless WAN network to the user devices 740 and 750. Because transmission over a wireless WAN network may be relatively expensive, the system 700 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 730). In these implementations, the camera 730 may be set to capture images on a periodic basis when the alarm system is armed in an "away" state, but set not to capture images when the alarm system is armed in a "home" state or disarmed. In addition, the camera 730 may be triggered to begin capturing images when the alarm system detects an event, such as an alarm event, a door-opening event for a door that leads to an area within a field of view of the camera 730, or motion in the area within the field of view of the camera 730. In other implementations, the camera 730 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory.

Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method for surveilling an area using a drone from a drone system, the method comprising:

obtaining, using one or more processors of the drone system, image data using a plurality of imaging devices installed at the drone;

processing, using the one or more processors of the drone system, the image data to detect an object that is external to the drone;

in response to processing the image data, determining, using the one or more processors of the drone system, a plurality of viewing angles indicated in the image data with respect to the object;

based on the image data and the plurality of viewing angles, identifying, using the one or more processors of the drone system, a first section of the area for surveillance and a second, different section of the area to be excluded from surveillance;

dynamically calculating a respective frame coverage for the plurality of imaging devices installed at the drone, wherein each of the respective frame coverages are calculated concurrently as the image data is being obtained;

determining, based on the respective frame coverage and using the one or more processors of the drone system, an adjustment to at least one of the plurality of viewing angles to cause the second, different section of the area to be excluded from surveillance; and based on the adjustment, controlling, using the one or more processors of the drone system, the plurality of imaging devices installed at the drone to exclude the second, different section of the area from surveillance imagery obtained by the drone.

2. The method of claim 1, wherein determining the adjustment to at least one of the plurality of viewing angles comprises:
selecting a first viewing angle among the plurality of viewing angles;
calculating a new viewing angle that decreases an amount of the second, different section that is viewable from the first viewing angle; and
determining the adjustment based on the new viewing angle.

3. The method of claim 2, comprising:
determining an operating altitude of the drone, wherein the operating altitude corresponds to an altitude range that allows the drone to exclude the second, different section of the area from being included in the surveillance imagery obtained by the drone; and
based at least on the operating altitude, controlling the drone, a sensor installed at the drone, and the imaging device to exclude the second, different section of the area from surveillance imagery obtained by the drone.

4. The method of claim 1, wherein determining the adjustment to at least one of the plurality of viewing angles comprises:
determining a physical attribute of the object; and
determining the adjustment based on the physical attribute of the object.

5. The method of claim 1, wherein the object:
is intermediate the first section and the second, different section of the area; and
defines a boundary that separates a first property represented by the first section owned by a first entity and a second, different property represented by the second, different section owned by a second entity.

6. The method of claim 1, wherein the object is a virtual object inserted as an overlay to define a boundary between the first section and the second, different section.

7. The method of claim 1, wherein determining the adjustment to at least one of the plurality of viewing angles comprises:
determining the adjustment based on an adjustment algorithm that is implemented using the imaging device, a sensor installed at the drone, and on-board circuitry of the drone.

8. The method of claim 7, wherein the adjustment algorithm is an on-board viewing angle adjustment algorithm that is implemented using software instructions executed by a processor integrated in the on-board circuitry of the drone.

9. The method of claim 7, wherein the adjustment algorithm is operable to adjust viewing angles of the imaging device during operation of the drone as the drone obtains surveillance imagery of a property.

10. The method of claim 1, comprising:
performing an initial mapping of the area based on a mapping algorithm;
generating an initial map of the area in response to performing the initial mapping; and
generating, using the mapping algorithm, one or more subsequent maps of the area based on the adjustment.

11. The method of claim 1, wherein:
the drone includes a plurality of cameras, and each camera of the plurality of cameras represents a respective imaging device installed at the drone; and
processing the image data comprises determining frame coverages for each of the plurality of cameras installed at the drone.

12. A drone system for surveilling an area using a drone, the system comprising:
one or more processors;
one or more non-transitory machine-readable storage devices storing instructions that are executable by the one or more processors to cause performance of operations comprising:
obtaining image data using an imaging device installed at the drone;
processing the image data to detect an object that is external to the drone;
in response to processing the image data, determining a plurality of viewing angles indicated in the image data with respect to the object;
based on the image data and the plurality of viewing angles, identifying a first section of the area for surveillance and a second, different section of the area to be excluded from surveillance;
dynamically calculating a respective frame coverage for the plurality of imaging devices installed at the drone, wherein each of the respective frame coverages are calculated concurrently as the image data is being obtained;
determining, based on the respective frame coverage, an adjustment to at least one of the plurality of viewing angles to cause the second, different section of the area to be excluded from surveillance; and
based on the adjustment, controlling the imaging device installed at the drone to exclude the second, different section of the area from surveillance imagery obtained by the drone.

13. The drone system of claim 12, wherein determining the adjustment to at least one of the plurality of viewing angles comprises:
selecting a first viewing angle among the plurality of viewing angles;
calculating a new viewing angle that decreases an amount of the second, different section that is viewable from the first viewing angle; and
determining the adjustment based on the new viewing angle.

14. The drone system of claim 13, wherein the operations comprise:
determining an operating altitude of the drone, wherein the operating altitude corresponds to an altitude range that allows the drone to exclude the second, different section of the area from being included in the surveillance imagery obtained by the drone; and
based at least on the operating altitude, controlling the drone, a sensor installed at the drone, and the imaging device to exclude the second, different section of the area from surveillance imagery obtained by the drone.

15. The drone system of claim 12, wherein determining the adjustment to at least one of the plurality of viewing angles comprises:
determining a physical attribute of the object; and
determining the adjustment based on the physical attribute of the object.

16. The drone system of claim 12, wherein the object:
is intermediate the first section and the second, different section of the area; and
defines a boundary that separates a first property represented by the first section owned by a first entity and a second, different property represented by the second, different section owned by a second entity.

17. The drone system of claim 12, wherein the object is a virtual object inserted as an overlay to define a boundary between the first section and the second, different section.

18. The drone system of claim 12, wherein determining the adjustment to at least one of the plurality of viewing angles comprises:
  determining the adjustment based on an adjustment algorithm that is implemented using the imaging device, a sensor installed at the drone, and on-board circuitry of the drone;
  wherein the adjustment algorithm is an on-board viewing angle adjustment algorithm that is implemented using software instructions executed by a processor integrated in the on-board circuitry of the drone.

19. One or more non-transitory machine-readable storage devices storing instructions for a drone system for surveilling an area using a drone, the instructions being executable by one or more processors to cause performance of operations comprising:
  obtaining image data using an imaging device installed at the drone;
  processing the image data to detect an object that is external to the drone;
  in response to processing the image data, determining a plurality of viewing angles indicated in the image data with respect to the object;
  based on the image data and the plurality of viewing angles, identifying a first section of the area for surveillance and a second, different section of the area to be excluded from surveillance;
  dynamically calculating a respective frame coverage for the plurality of imaging devices installed at the drone, wherein each of the respective frame coverages are calculated concurrently as the image data is being obtained;
  determining, based on the respective frame coverage, an adjustment to at least one of the plurality of viewing angles to cause the second, different section of the area to be excluded from surveillance; and
  based on the adjustment, controlling the imaging device installed at the drone to exclude the second, different section of the area from surveillance imagery obtained by the drone.

* * * * *